United States Patent [19]

Canniff et al.

[11] Patent Number: 5,251,208
[45] Date of Patent: Oct. 5, 1993

[54] DIGITAL SIGNAL PROCESSOR SYNCHRONOUS NETWORK

[75] Inventors: Ronald J. Canniff; Philip C. Chao, both of Naperville; Alan H. Matten, Chicago; Charles E. Stroud, North Aurora, all of Ill.

[73] Assignee: AT&T Bell Laboratories, Murray Hill, N.J.

[21] Appl. No.: 810,100

[22] Filed: Dec. 19, 1991

[51] Int. Cl.$^5$ ............................................... H04J 3/00
[52] U.S. Cl. .................................... 370/77; 370/58.1; 370/85.7; 370/110.3; 364/131; 364/136
[58] Field of Search ......................... 370/77, 85.7, 58.1, 370/110.3; 364/131, 136

[56] References Cited

U.S. PATENT DOCUMENTS 4,733,390 3/1988 Shirakawa et al. ............ 370/85.7 X
4,968,977 11/1990 Chinnaswamy et al. ....... 370/58.1 X

OTHER PUBLICATIONS

*The Bell System Technical Journal,* vol. 60, No. 7, Part 2, Sep. 1981 whole book.

Primary Examiner—Douglas W. Olms
Assistant Examiner—Russell W. Blum
Attorney, Agent, or Firm—Ross T. Watland

[57] ABSTRACT

An arrangement where a plurality of digital signal processors cooperate in the performance of a digital signal processing function. The processors are interconnected by means of a synchronous network which provides time division multiplexed communication links between processors for communicating intermediate processing results therebetween. The synchronous network includes a plurality of port circuits each associated with one of the processors. The network generates timing signals defining frames of time slots and defining superframes comprising N frames. Each port circuit can control the transmission of digital data from a memory of its associated processor during M1 time slots of each superframe. Each port circuit can also control the writing of digital data to its associated processor during M2 time slots of each superframe. The value of N, the number of frames per superframe, is programmable. The values of M1 and M2 are also programmable for each port circuit.

28 Claims, 16 Drawing Sheets

FIG. 3

| TIMESLOT # | FRAME # | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | X | X | X | X | X | X | X | X | X | X | X | X | X | X | X | X | X | X | X | X |
| 1 | | | | | | | | | | | | | | | | | | | | |
| 2 | X | X | X | X | X | X | X | X | X | X | X | X | X | X | X | X | X | X | X | X |
| 3 | | | | | | | | | | | | | | | | | | | | |
| 4 | X | X | X | X | X | X | X | X | X | X | X | X | X | X | X | X | X | X | X | X |
| 5 | X | X | X | X | X | X | X | X | X | X | X | X | X | X | X | X | X | X | X | X |
| 6 | | | | | | | | | | | | | | | | | | | | |
| 7 | | | | | | | | | | | | | | | | | | | | |
| ⋮ | | | | | | | | | | | | | | | | | | | | |
| 14 | | | | | | | | | | | | | | | | | | | | |
| 15 | X | X | X | X | X | X | X | X | X | X | X | X | X | X | X | X | X | X | X | X |
| 16 | X | X | X | X | X | X | X | X | X | X | X | X | X | X | X | X | X | X | X | X |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 38 | X | X | X | X | X | X | X | X | X | X | X | X | X | X | X | X | X | X | X | X |
| 39 | | | | | | | | | | | | | | | | | | | | |
| 40 | | | | | | | | | | | | | | | | | | | | |
| ⋮ | | | | | | | | | | | | | | | | | | | | |
| 84 | | | | | | | | | | | | | | | | | | | | |
| 85 | X | X | X | X | X | X | X | X | X | X | X | X | X | X | X | X | X | X | X | X |
| 86 | X | X | X | X | X | X | X | X | X | X | X | X | X | X | X | X | X | X | X | X |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 115 | X | X | X | X | X | X | X | X | X | X | X | X | X | X | X | X | X | X | X | X |
| 116 | | | | | | | | | | | | | | | | | | | | |
| 117 | | | | | | | | | | | | | | | | | | | | |
| ⋮ | | | | | | | | | | | | | | | | | | | | |
| 122 | | | | | | | | | | | | | | | | | | | | |
| 123 | X | X | X | X | X | X | X | X | X | X | X | X | X | X | X | X | X | X | X | X |
| 124 | X | X | X | X | X | X | X | X | X | X | X | X | X | X | X | X | X | X | X | X |
| 125 | X | X | X | X | X | X | X | X | X | X | X | X | X | X | X | X | X | X | X | X |
| 126 | X | X | X | X | X | X | X | X | X | X | X | X | X | X | X | X | X | X | X | X |
| 127 | X | X | X | X | X | X | X | X | X | X | X | X | X | X | X | X | X | X | X | X |

FIG. 4

| TIMESLOT # | FRAME # | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | X | X | X | X | X | | | | | | | | | | | | | | | |
| 1 | X | X | X | X | X | | | | | | | | | | | | | | | |
| 2 | X | X | X | X | X | | | | | | | | | | | | | | | |
| 3 | X | X | X | X | X | | | | | | | | | | | | | | | |
| ⋮ | ⋮ | ⋮ | ⋮ | ⋮ | ⋮ | | | | | | | | | | | | | | | |
| 124 | X | X | X | X | X | | | | | | | | | | | | | | | |
| 125 | X | X | X | X | X | | | | | | | | | | | | | | | |
| 126 | X | X | X | X | X | | | | | | | | | | | | | | | |
| 127 | X | X | X | X | X | | | | | | | | | | | | | | | |

FIG. 5

| TIMESLOT # | FRAME # | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | X | X | X | X | | | | | | | | | | | | | | | | |
| 1 | X | X | X | X | | | | | | | | | | | | | | | | |
| 2 | X | X | X | X | | | | | | | | | | | | | | | | |
| 3 | X | X | X | X | | | | | | | | | | | | | | | | |
| ⋮ | ⋮ | ⋮ | ⋮ | ⋮ | | | | | | | | | | | | | | | | |
| 60 | X | X | X | X | | | | | | | | | | | | | | | | |
| 61 | X | X | X | X | | | | | | | | | | | | | | | | |
| 62 | X | X | X | X | | | | | | | | | | | | | | | | |
| 63 | X | X | X | X | | | | | | | | | | | | | | | | |
| 64 | X | X | X | | | | | | | | | | | | | | | | | |
| 65 | X | X | X | | | | | | | | | | | | | | | | | |
| 66 | X | X | X | | | | | | | | | | | | | | | | | |
| 67 | X | X | X | | | | | | | | | | | | | | | | | |
| ⋮ | ⋮ | ⋮ | ⋮ | | | | | | | | | | | | | | | | | |
| 124 | X | X | X | | | | | | | | | | | | | | | | | |
| 125 | X | X | X | | | | | | | | | | | | | | | | | |
| 126 | X | X | X | | | | | | | | | | | | | | | | | |
| 127 | X | X | X | | | | | | | | | | | | | | | | | |

DSP INTERFACE SIGNALS

COMMON MEMORY INTERFACE SIGNALS

PROCESSOR INTERFACE SIGNALS

DATA SELECTOR

PORT CONTROLLER

INDIVIDUAL INTERRUPT INTERVAL REGISTER

ADDRESS GENERATION UNIT

DIGITAL SIGNAL PROCESSOR SYNCHRONOUS NETWORK

TECHNICAL FIELD

This invention relates to real-time signal processing apparatus.

BACKGROUND AND PROBLEM

Digital technology is being rapidly applied to telecommunications applications including transmission, switching, and station equipment. When signals are encoded digitally, they are easily manipulated by computers and other systems that incorporate advanced very-large-scale integrated circuit technology (VLSI). The VLSI advantages include small size, high reliability, low cost, and low power consumption. As this trend continues, it is possible to perform previous functions, as well as new ones not possible before, with digital techniques that were formerly performed with analog circuits.

Signal processing is the generation, filtering, detection, and modulation of signals. Most algorithms for signal processing repeatedly use multiplications and additions. The input is a sequence of numbers with a new input value typically available every 125 microseconds. The output is another sequence of numbers that must be computed at the same rate. Processors, referred to as digital signal processors, have been designed which use a parallel, pipelined architecture providing maximum throughput by keeping all sections of the processor efficiently busy at all times. As technology advances, the processing capacity of digital signal processors has increased as well. With any given technology however, the maximum processing capacity does limit the magnitude or number of processing functions that can be performed by a single digital signal processor.

Solution

This limitation is overcome and a technical advance is achieved in accordance with the principles of the invention in an exemplary arrangement where a plurality of digital signal processors cooperate in the performance of a digital signal processing function and where such processors are interconnected by means of a synchronous network which importantly provides time division multiplexed communication links between processors for communicating intermediate processing results therebetween. No address and other overhead processing is required as would be necessary for asynchronous communication. The synchronous network includes a plurality of port circuits each associated with one of the processors. The network generates timing signals defining frames of time slots and defining superframes comprising N frames. Each port circuit can control the transmission of digital data from a memory of its associated processor during M1 time slots of each superframe. Each port circuit can also control the writing of digital data to its associated processor during M2 time slots of each superframe. This reduces the memory required for each processor since there is no need to store full frames of time slots. The value of N, the number of frames per superframe, is programmable. The values of M1 and M2 are also programmable for each port circuit.

In the exemplary embodiment, the synchronous network provides full connectivity among the processors. Processors may be interconnected in one way during certain time slots but in another way during other time slots. Each given port circuit of the network includes a data selector for selectively connecting any of the other port circuits to the given port circuit, and a control memory used to control the selective connections of the data selector.

Illustratively, the apparatus may also include a common memory coupled to the network which may be used as the source of input signals for the digital signal processing function. Such common memory may, for example, store encoded low bit rate speech signals for use by any of the processors in generating announcements. The final results of the digital signal processing function, for example pulse code modulation (PCM) speech samples, would then be transmitted by another port circuit of the synchronous network onto a time multiplexed line. The apparatus is also usable to process input signals received on a time division multiplexed line via a port circuit to perform functions such as tone detection.

The memory associated with each processor is doubled buffered. Information is written into a first buffer and read from a second buffer during one frame; information is written into the second buffer and read from the first buffer during the next frame. This prevents any possibility of the communication between processors becoming out of sequence since neither buffer is being both written into and read from during the same frame.

The network is also able to transmit interrupt signals from each of its port circuits to the associated processors. The interrupt rate is programmable for each of the port circuits.

DRAWING DESCRIPTION

FIGS. 3-5 are time slot usage diagrams used for the synchronous network port circuits associated with the processors of FIG. 1;

DETAILED DESCRIPTION

Illustrative Example

Figure 1:
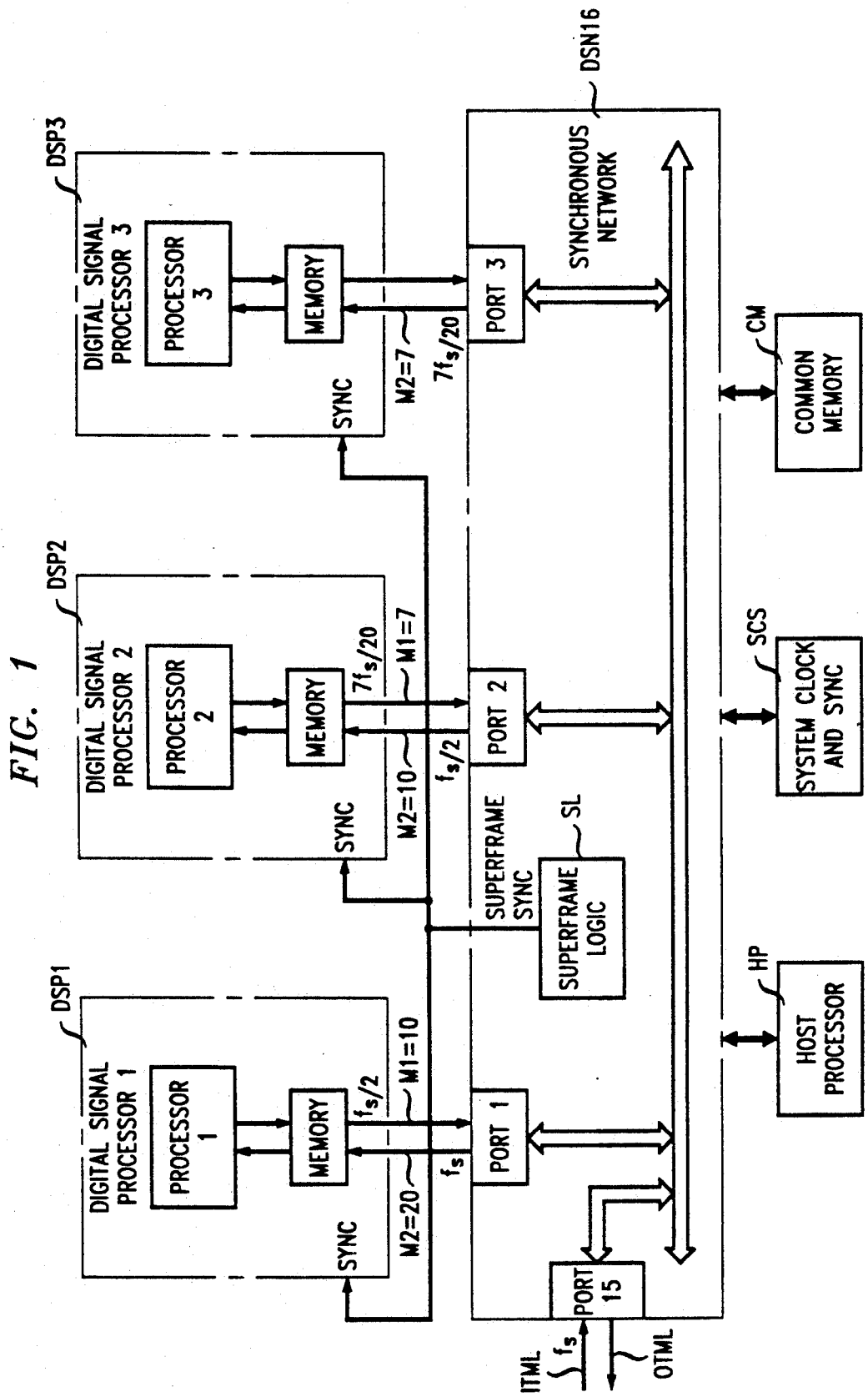
FIG. 1 is a diagram of an illustrative apparatus in accordance with the invention including three digital signal processors and a synchronous network interconnecting them to implement a multi-frequency (mf) tone receiver.

FIG. 1 illustrates an arrangement where three digital signal processors, DSP1, DSP2, and DSP3 cooperate in the performance of a multi-frequency (mf) tone receiver function. The three processors are interconnected by means of synchronous network DSN16. Network DSN16 provides time division multiplexed communication links between processors for communicating intermediate processing results therebetween. Network DSN16 includes port circuits PORT1, PORT2, and PORT3 each associated with one of the processors DSP1, DSP2, and DSP3. Network DSN16 includes superframe logic circuit SL which generates timing signals defining frames of, for example, 128, sixteen-bit time slots and superframes comprising N=20 frames. Each port circuit PORT1, PORT2, and PORT3, can control the transmission of digital data from a memory of its associated processor during M1 time slots of each superframe. For processor DSP1, M1=10, and for processor DSP2, M1=7. The results obtained by processor DSP3 are communicated to the host processor HP via a separate processor interface. Each port circuit PORT1, PORT2, and PORT3 can also control the writing of digital data to its associated processor during M2 time slots of each superframe. For processor DSP1, M2=20, for processor DSP2, M2=10, and for processor DSP3, M2=7. The value of N, the number of frames per superframe, is programmable. The values of M1 and M2 are also programmable for each port circuit.

Synchronous network DSN16 provides full connectivity among the processors DSP1, DSP2, and DSP3 as well as many as 13 other processors (not shown). Processors may be interconnected in one way during certain time slots but in another way during other time slots. Each given port circuit PORT1, PORT2 and PORT3 includes a data selector (not shown) for selectively connecting any other port circuit to the given port circuit, and a control memory (not shown) used to control the selective connections of the data selector. In the example illustrated in FIG. 1, input signals are received on a time division multiplexed line ITML via a port circuit PORT15 to perform the mf tone detection function. In other examples, a common memory CM may be used as the source of input signals for the digital signal processing function. The final results of the digital signal processing function would then be transmitted via port circuit PORT15 to outgoing time multiplexed line OTML. Final signal processing results may also be stored in the common memory CM. The memory associated with each processor DSP1, DSP2, and DSP3 is double buffered. Synchronous network DSN16 is also able to transmit interrupt signals from each of its port circuits to the associated processors. Interrupts within a frame are useful for processing groupings of time slots. The interrupt rate is programmable for each of the port circuits.

Figure 2:
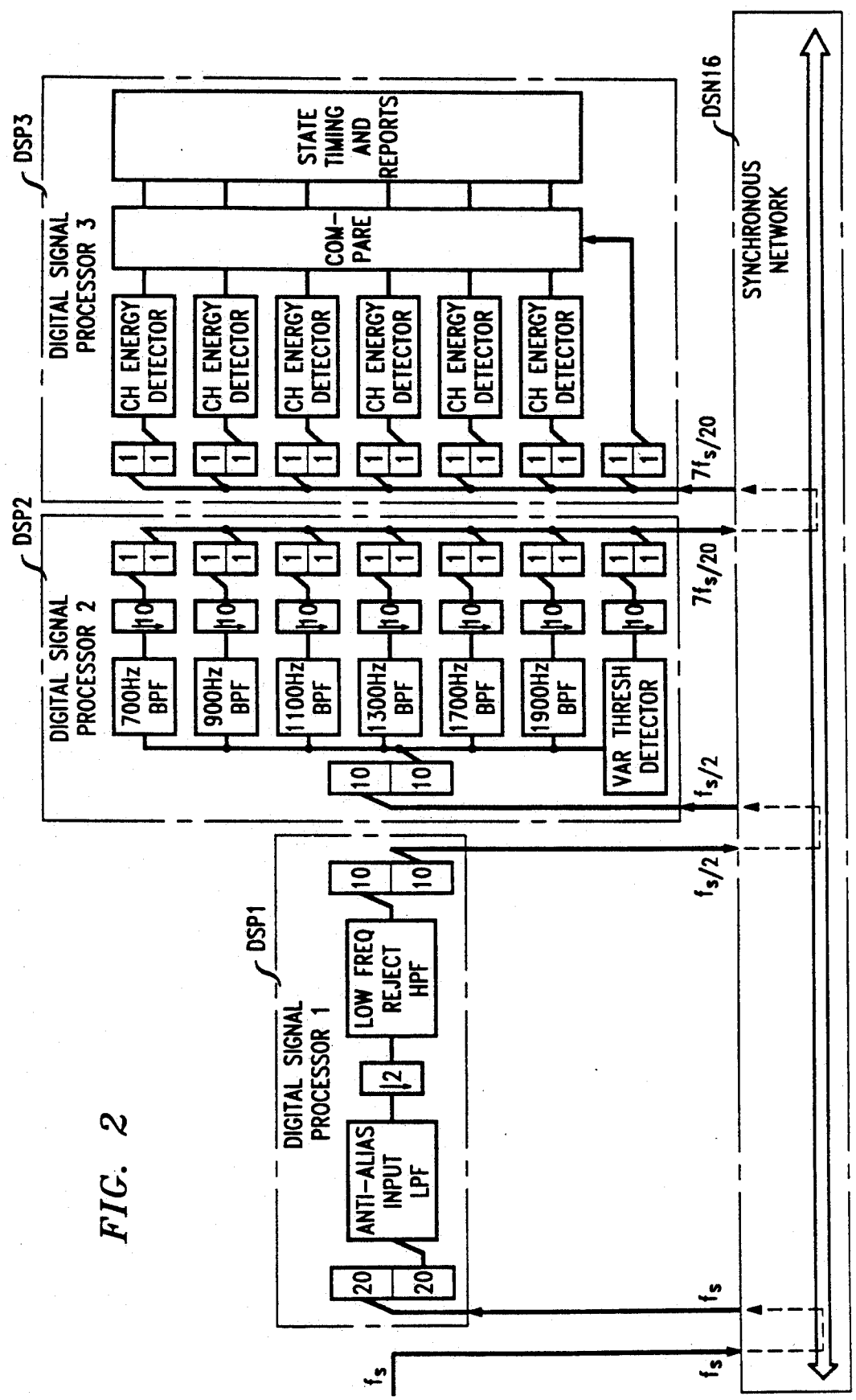
FIG. 2 is a detailed diagram showing the digital signal processing functions performed by the processors of FIG. 1.

The processing actions performed by each of the processors DSP1, DSP2, and DSP3 are broken down into the various functions required in an mf receiver in FIG. 2. In a given superframe of N=20 frames, processor DSP1 receives 20 samples (time slots), performs a low pass filter operation, downsamples by a factor of two, performs a high pass filter operation, and obtains 10 intermediate results. Processor DSP2 receives the 10 intermediate results, processes them by means of six bandpass filters and a variable threshold detector to obtain seven intermediate results. Processor DSP3 receives the seven intermediate results, performs channel energy detection, comparison, timing and reporting functions. Final results are communicated to the host processor HP.

FIG. 2 relates to the signal processing of a single input channel. The arrangement can however be programmed to perform the mf receiver function for 64 input channels as an example. Tables 1, 2 and 3 provide the information necessary to program the port circuits PORT1, PORT2, and PORT3 respectively. Note that during idle time slots, an alternate data register is connected to the port circuit. The time slot usage for the three port circuits PORT1, PORT2, and PORT3 is depicted in FIGS. 3-5.

TABLE 1

Program Port1: This algorithm can support 64 simultaneous service elements. The control RAM for PORT1 (DSP1) will be programmed to select the 64 timeslots from the incoming PIDB data stream that was assigned at initialization for this set of three DSP's to process. Each service element must obtain 1 timeslot for each of the 20 subframes within the superframe. For this example, timeslots 0, 2, 4–5, 15–38, 85–115 and 123–127 are the 64 timeslots assigned to the 64 service elements.

The timeslots that were allocated will require the DSN16 Control RAM to set up the following channels within the superframe:

ACTIVE CHANNELS:

- 40 1-timeslot channels (20 for each timeslot 0 and 20 for each timeslot 2)
- 20 2-timeslot channels (each timeslot 4 and 5 pair)
- 20 5-timeslot channels (each timeslot 123–127 group)
- 20 24-timeslot channels (each timeslot 15–38 group)
- 20 31-timeslot channels (each timeslot 85–115 group)

IDLE CHANNELS:

- 40 1-timeslot channels (20 for each timeslot 1 and 20 for each timeslot 3)
- 20 9-timeslot channels (each timeslot 6–14 group)
- 20 46-timeslot channels (each timeslot 39–84 group)
- 20 7-timeslot channels (each timeslot 116–122 group)

The following instructions in the PORT1 Control RAM will allocate the appropriate channels specified above:

| INSTRUCTION # | DESCRIPTION |
| --- | --- |
| 1 | Source the data coming from PORT15 for 1 timeslot |
| 2 | Source the data coming from Alternate Data Reg 0 (ADR0) for 1 timeslot |
| 3 | Source the data coming from PORT15 for 1 timeslot |
| 4 | Source the data coming from ADR0 to 1 timeslot |
| 5 | Source the data coming from PORT15 for 2 timeslots |
| 6 | Source the data coming from ADR0 for 9 timeslots |
| 7 | Source the data coming from PORT15 for 24 timeslots |
| 8 | Source the data coming from ADR0 for 46 timeslots |
| 9 | Source the data coming from PORT15 for 31 timeslots |
| 10 | Source the data coming from ADR0 for 7 timeslots |
| 11 | Source the data coming from PORT15 for 5 timeslots and enable the GOTO TOP BIT. |

TABLE 2

Program Port2: The control RAM for PORT2 (DSP2) will be programmed to select 10 timeslots for each of the 64 service element outputs of DSP1. This corresponds to 10*64 = 640 timeslots from DSP1. Each service element on DSP2 must obtain 10 timeslots for each of the 64 service elements.
Because of the double buffering at the output of DSP1, all 10 of the timeslots for each service element will be present at the start of the superframe. Therefore a single channel can be established. This will require the DSN16 Port2 Control RAM to set up the following channels within the superframe:
ACTIVE CHANNELS:
1 640-timeslot channel (first 640 timeslots)
IDLE CHANNELS:
1 1920-timeslot channel (last 1920 timeslots)
The following instructions in the PORT2 Control RAM will allocate the appropriate channels specified above:

| INSTRUCTION # | DESCRIPTION |
| --- | --- |
| 1 | Source the data coming from PORT1 for 640 timeslots |
| 2 | Source the data coming from Alternate Data Reg 0 (ADR0) for all remaining timeslots until next superframe. |

TABLE 3

Program Port3: The control RAM for PORT3 (DSP3) will be programmed to select 7 timeslots for each of the 64 service element outputs of DSP2. This corresponds to 7*64 = 448 timeslots from DSP2. Each service element on DSP3 must obtain 7 timeslots for each of the 64 service elements.
Because of the double buffering at the output of DSP2, all 7 of the timeslots for each service element will be present at the start of the superframe. Therefore a single channel can be established. This will require the DSN16 Port3 Control RAM to set up the following channels within the superframe:
ACTIVE CHANNELS:
1 448-timeslot channel (first 448 timeslots)
IDLE CHANNELS:
1 2112-timeslot channel (last 2112 timeslots)
The following instructions in the PORT2 Control RAM will allocate the appropriate channels specified above:

| INSTRUCTION # | DESCRIPTION |
| --- | --- |
| 1 | Source the data coming from PORT2 for 448 timeslots |
| 2 | Source the data coming from Alternate Data Reg 0 (ADR0) for all remaining timeslots until next superframe. |

Functional Overview

Figure 6:
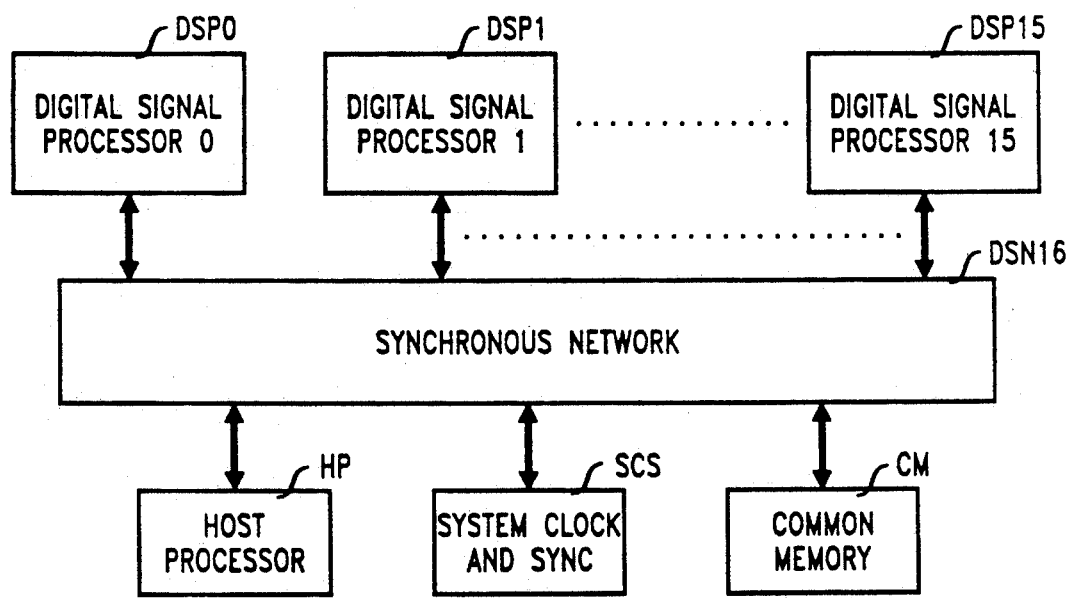
FIG. 6 is a general configuration diagram for a synchronous network interconnecting 16 digital signal processors.

The DSN16 device is an integrated circuit that provides the interconnection and intercommunication network for an array of Digital Signal Processors (DSPs) and a common shared memory (CM). The DSN16 can interface to 16 DSPs. A possible configuration of the device with an array of 16 DSPs and a common memory is illustrated in FIG. 6. The device has four major interfaces: the Processor Interface, the Common Memory Interface, the System Interface, and the DSP Interface.

Figure 7:
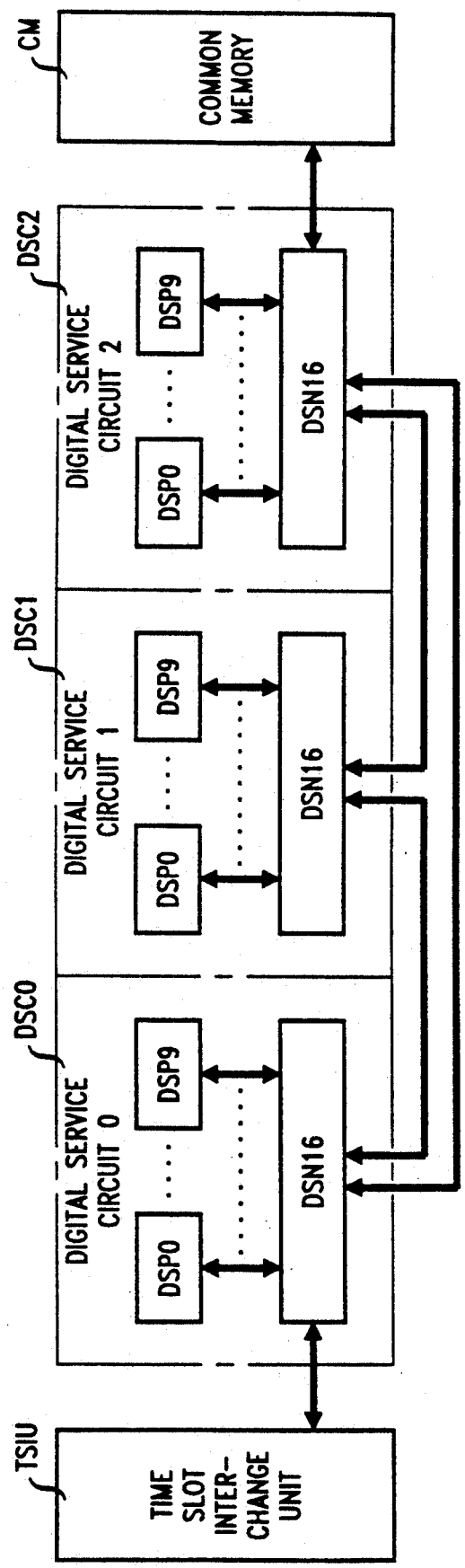
FIG. 7 is a diagram illustrating the interconnection of multiple synchronous networks.

The DSP Interface can also be used as communication ports to other DSN16 devices such that large arrays of DSPs can be constructed with communications between DSPs in other banks or with the common memory through the DSN16 devices. One such configuration is illustrated in FIG. 7. One Digital Service Circuit (DSC) circuit board provides the interface with the common memory (consisting of up to four optional memory boards) for up to two other DSC circuit boards. In addition, one DSP interface port on the first DSC circuit board is connected via time-multiplexed lines to the Time Slot Interchange Unit (TSIU) of the 5ESS ® switch manufactured by AT&T. DSP ports 0 through 9 are used in the DSC3 to access ten DSPs, for example the DSP32C manufactured by AT&T, while DSP ports 10 through 14 are used for communication with the other DSC circuit packs and DSP port 15 is used to interface to the TSIU. Communication is through serial data streams partitioned into time slots of 16 or 32 bits each. Reconfiguration of the communication interconnections is performed on time slot boundaries.

The configuration of communications between the TSIU, the DSPs, the DSC circuit packs, and the Common Memory during a given time slot is established by data written into various memories in the DSN16 which take the form of Random Access Memories (RAMs), register files, and registers. In addition, certain intercommunication features such as access to the common memory are defined by data in the time slots themselves in conjunction with the configuration of the memories of the DSN16.

Interfaces

Figure 8:
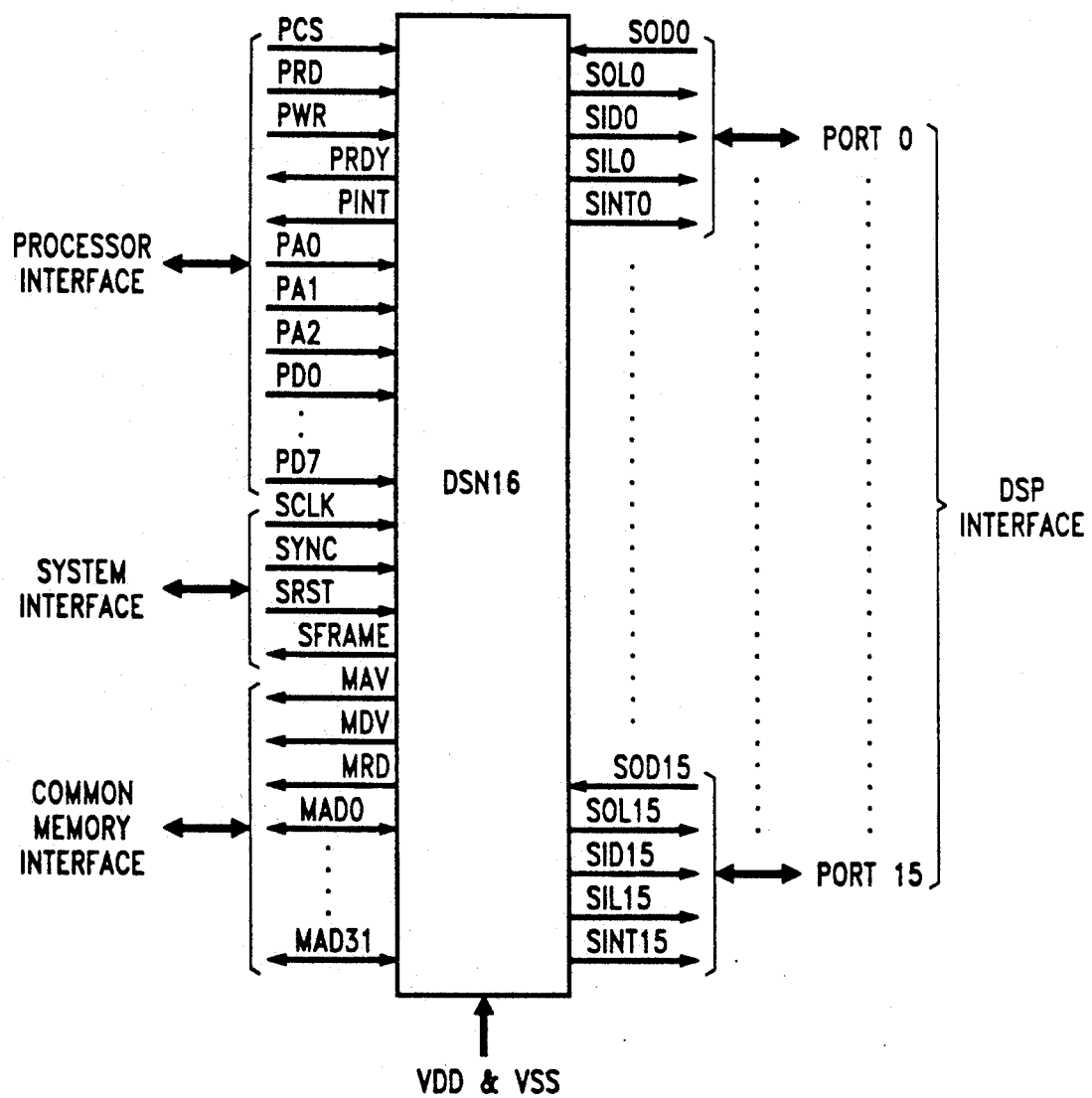
FIG. 8 is a diagram illustrating the pins and interfaces for the synchronous network of FIGS. 1 and 6.

The pin out for the DSN16 devices is illustrated in FIG. 8. The device is packaged in a 164 pin plastic quad flat package. The DSP interface consists of 16 serial port interfaces. Each DSP serial port interface consists of four outputs and an input. The Common Memory Interface consists of 32 bidirectional multiplexed address and data pins and three outputs. The Processor Interface consists of 8 bidirectional data pins, three address inputs, three other inputs and two outputs. The System Interface consists of three system inputs for clock, synchronization, and power-up preset, and super frame synchronization output. For the six DSP ports used to communicate with the other DSC3 circuit packs and the TSIU, only the data inputs and outputs, SID and SOD, respectively, are connected.

DSP Interface

Figure 9:
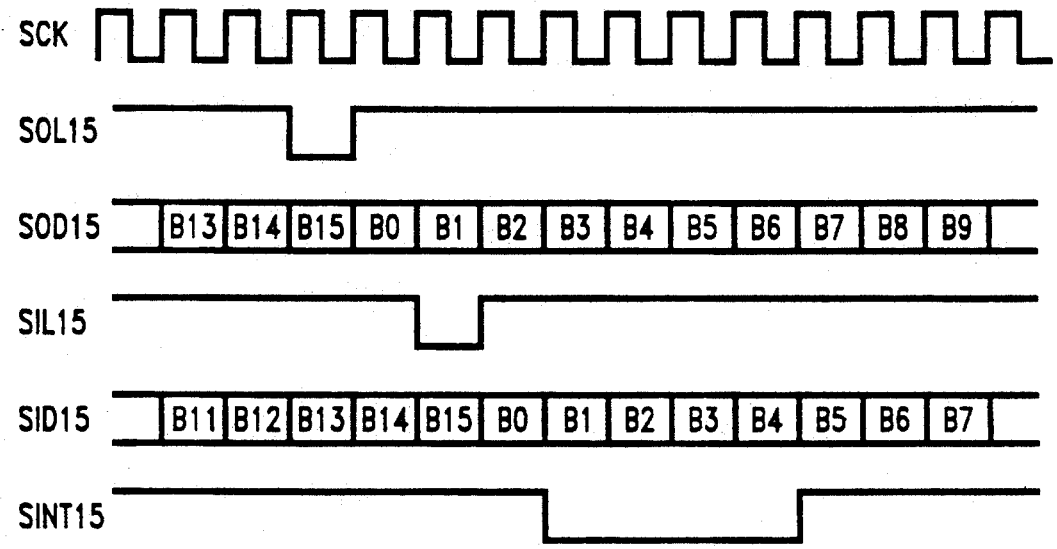
FIG. 9 is a timing diagram for digital signal processor interface signals.

The set of five leads connected to each DSP consists of four outputs (SIL, SOL, SINT, and SID) and one input (SOD). The chip input SOD is the output serial data from the DSP while the chip output SID is the corresponding serial data input to the DSP. The serial data is partitioned into time slots of either 16 or 32 bits. The chip outputs SIL and SOL are load signals to the DSP indicating that time slot data is being sent to or should be received from the DSP, respectively. These two signals are active low and are activated by the DSN16 one clock cycle prior to the beginning of the time slot data as illustrated in FIG. 9. The chip output SINT is an interrupt to the DSP and is activated (active low) one clock cycle after the beginning of the time slot data being sent to the DSP. The width of the interrupt signal is programmable to be from one to four clock cycles in duration. In addition, the occurrence of the interrupt is programmable on a per port basis in terms of an integral number of time slots.

Common Memory Interface

Figure 10:
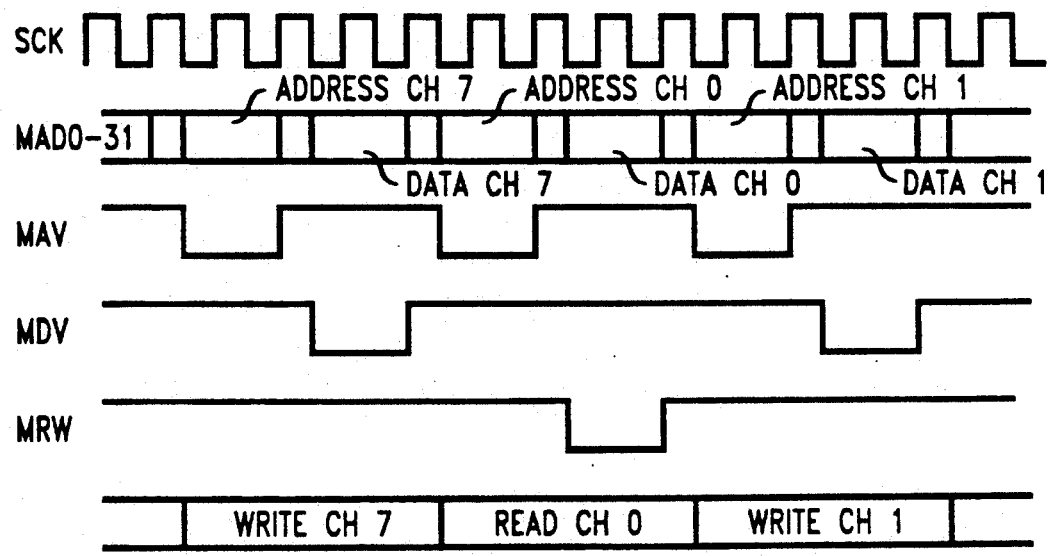
FIG. 10 is a timing diagram for common memory interface signals.

The Common Memory Interface consists of a 32-bit bidirectional bus which contains multiplexed address and data (MAD0-31) and three outputs (MAV, MDV, and MRW). In 32 clock cycles, either four or eight accesses of the Common Memory can be performed. This number of accesses or channels is programmable in the DSN16. The relative timing of the Common Memory Interface is illustrated in FIG. 10 for the eight channel configuration. In this configuration each access of the common memory is performed in four clock cycles with the first two clock cycles devoted to supplying the address to the common memory as specified by the address valid output (MAV) going active low. The latter two clock cycles are used to supply or receive data during a write or read access, respectively. A write to the common memory is indicated by the data valid output (MDV) going active low at which time the data is driven onto the bus by the DSN16. Conversely, during a read access, the read write output (MRW) goes low indicating that the common memory drives the bus. A half clock cycle of tristate time is allowed to the bus to "turn-around".

Processor Interface

Figure 11:
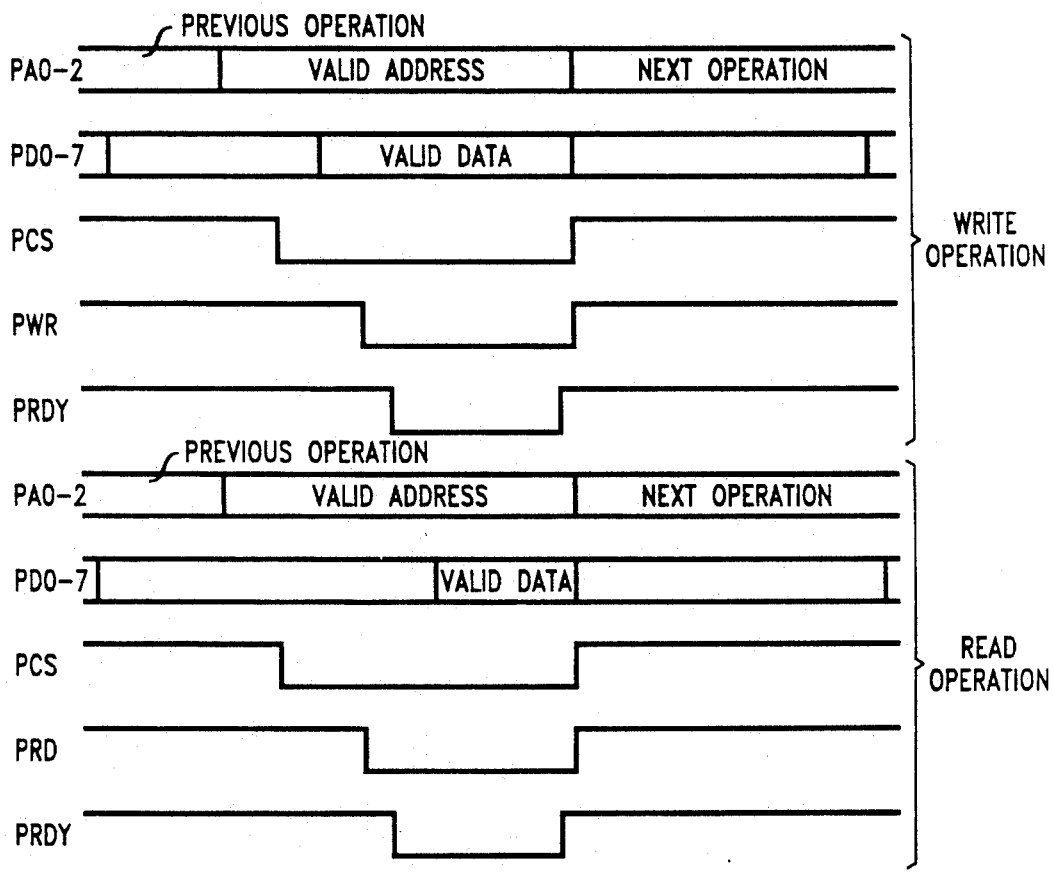
FIG. 11 is a timing diagram for host processor interface signals.

The Processor Interface consists of an eight bit bidirectional data bus (PD0-7), and three-bit address input bus (PA0-2), a chip select (PCS), a read input (PRD), a write input (PWR), a wait output (PRDY), and an interrupt (PINT). The relative timing for write and read operations is illustrated in FIG. 11. During a write operation the read input PRD remains high and, similarly, during a read operation, the write input PWR remain high. During a write operation the address and chip select are held valid while the write input is brought low at which point the write operation is activated indicated by the wait lead going low. When the write operation has completed internal to the DSN16, the wait lead is brought high and the chip select, write lead and address bus can be deactivated. Similarly, during a read the address bus and chip select are held valid while the read input is brought low at which time the wait lead is brought low and the DSN16 begins to drive the data bus with valid data. When the wait lead goes high the data is valid and the chip select, read input and address bus can be deactivated. The interrupt goes high when an unmasked error is encountered.

Architectural Overview

Figure 12:
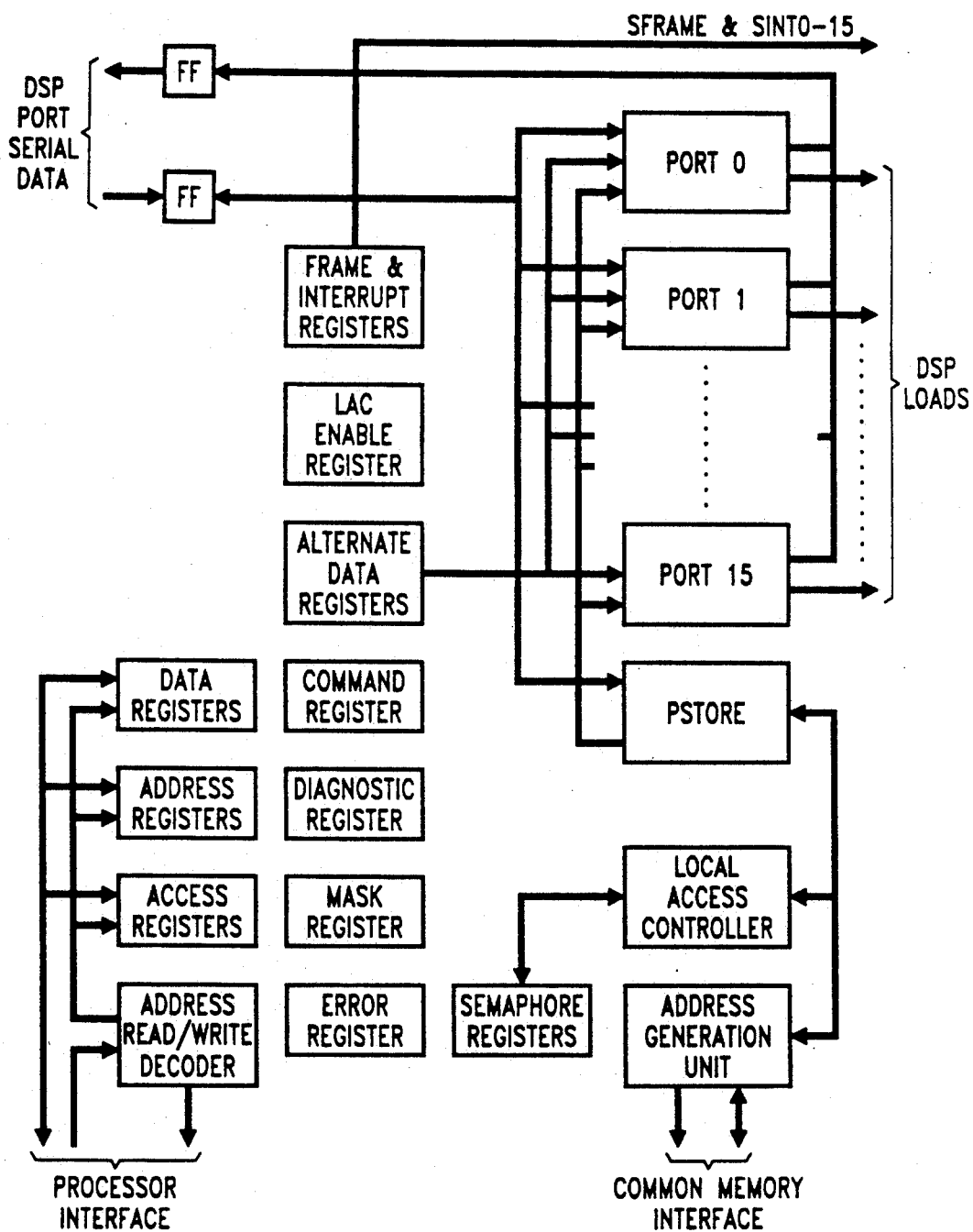
FIG. 12 is a block diagram of the synchronous network of FIGS. 1 and 6.

A high level block diagram of the DSN16 is given in FIG. 12. The incoming serial data from the sixteen DSP ports are clocked into the device and fanned out to all sixteen port circuits such that each DSP port can communicate with any other DSP port. The 16 port circuits can also select serial data from either of two Alternate Data Registers (ADRs). The selection of incoming DSP port data or ADR data is performed on a per port basis under the control of a Control RAM (CRAM) for the port circuit. The selected serial data is clocked out of the device destined for the circuit (DSP,DSN16, or TSIU interface) assigned to that particular port. The port circuit output serial data also goes to the Packet Store "Pstore" for local access of the Semaphore Registers (SREG), the Address Generation Unit (AGU), or the Common Memory Interface. Packets may come from the DSPs or ports. Eight local access channels can be serviced by the Local Access Controller (LAC) at a time. The eight responses from a local access exit the Pstore serially and fan out to all sixteen port circuits. The selection of local access data is performed by the CRAM in conjunction with the LAC.

All configuration on the interconnection and intercommunication network of the DSN16 are specified by the CRAMs in conjunction with other control registers in the device. Reconfiguration of the network is performed on a per time slot basis under the control of the information stored in the CRAMs. Access of the SREGs, the Address Generation Unit (AGU), and the Common Memory are determined for a given port by special local access control words in that port's CRAM. These control words indicate connection to the Pstore and a packet header in the time slot data entering the Pstore is interpreted by the LAC to determine the type of access (SREG, AGU, or Common Memory). The response data from the LAC and the specified access is placed back into the Pstore and routed back to the particular port for insertion into the output data stream for that port. The SREG provides a mechanism for specifying that a port has control of a given resource and consists of 32 single bit registers. The AGU consists of an Address RAM (ARAM), an Offset Register (OREG), and an ALU used to generate addresses for multi-word accesses of the Common Memory. The ARAM consists of 128, 31-bit memory locations used to specify addresses for the Common Memory. The OREG consists of 32, 16-bit registers to control the offset during address generation. During address generation, an address in the ARAM is supplied to the Common Memory and an offset value is added to the address which is then stored back in the ARAM as the next address to be supplied to the Common Memory. The data contained in the ARAM, OREG, and SREG can be written either through the processor interface or through the Pstore with the appropriate packet header and data formats. The Common Memory can also be accessed directly for single word reads and writes by special packet headers which contain the desired address to the Common Memory.

Access of the CRAMs, ARAM, OREG, and SREG as well as other registers via the processor interface is made through eight direct access registers: two ACCESS registers, two ADDRESS registers, and four RAM/REGISTER FILE DATA registers. The eight registers provide read and write access to ten additional registers as well as the CRAMs, ARAM, OREG, and SREG. The ten indirect access registers include a Command Register (for controlling various modes of operation), an Error Source Register and its associated Mask Register, a Diagnostic Register (for forcing errors and activating Built-In Self-Test capabilities), a BIST Register (for reading the results of the various Built-In Self-Test features), a Common Frame Interval Register (for specifying the size of a super frame), a Common Frame Interval Counter, two ADRs, and the Individual Interrupt Interval Registers (IIRs-used to program the interrupts to the DSPs). The following sections give a more detailed description of the architecture and operation of the various functional blocks of the DSN16. Although the port circuits are shown in FIG. 12 as separate units, they collectively comprise a Data Select circuit and a Port Controller. shown in FIGS. 13 and 14 and described herein. In other words, the individual port circuits of FIG. 12 each correspond to a part of the FIG. 13 Data Select circuit and to a part of the FIG. 14 Port Controller.

Data Select

Figure 13:
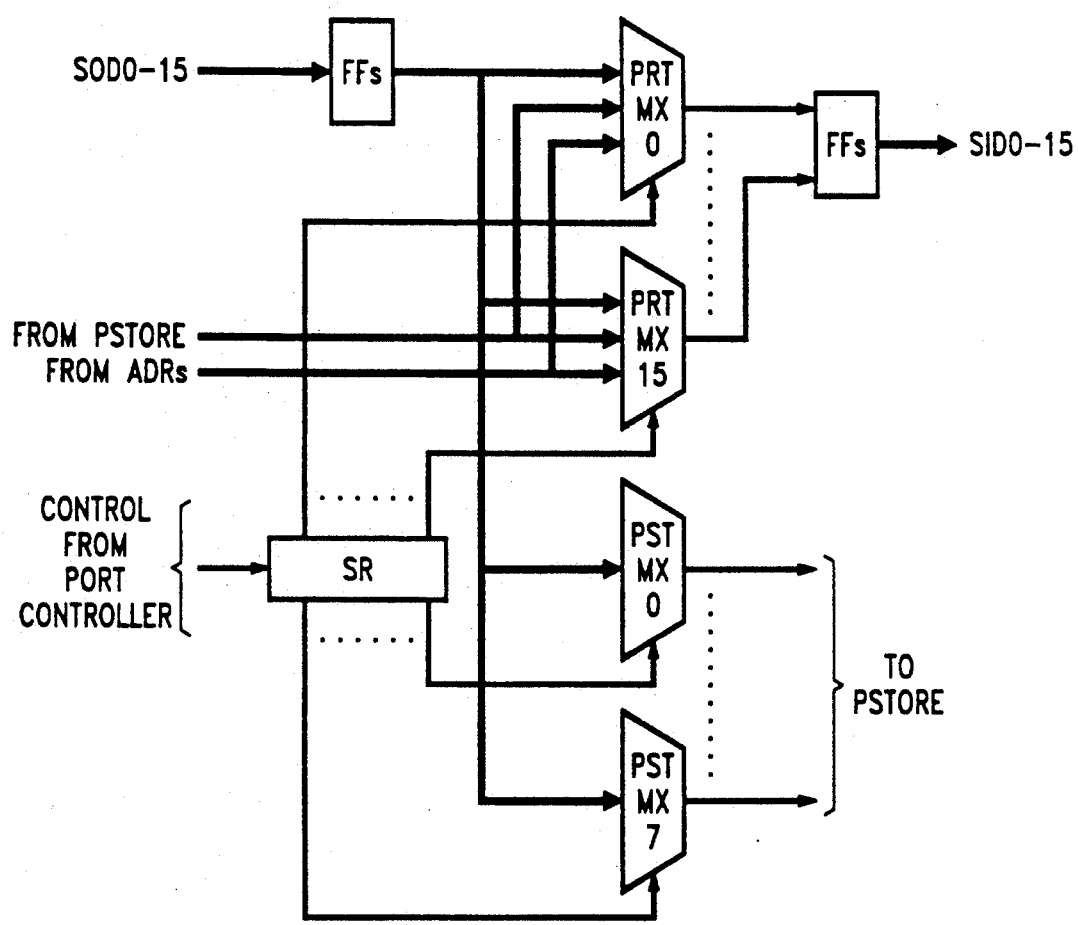
FIG. 13 is a block diagram of a data selector, a portion of which is in each of the 16 port circuits of FIG. 12.

The Data Select (DSEL) circuit provides the interconnection of the DSP ports and the Local Access Channels to/from the Pstore as shown in FIG. 13. Data from each of the 16 DSP ports enters the chip and is clocked through a flip-flop. The data then fans out to the 16 sets of multiplexers for each of the DSP port output data paths. Each multiplexer (PRTMX) can select data from any of the 16 DSP ports, the 8 Pstore channels, or the two ADRs under control of the Port Controller. Data destined for an assigned Pstore channel is also selected under the control of the Port Controller via the Pstore input multiplexers (PSTMX). Access to a Pstore channel is obtained by a control word in the CRAM for a given port which has the source equal to the destination. The destination port is the port for which the control word is being read such that the source equal to the destination would indicate a loopback condition. In conjunction with this loopback condition, the Local Access Enable bit for the port must be enabled. When this set of conditions is satisfied, a Local Access Channel in the Pstore is requested by the Port Controller and a vacant channel (if any exist) is assigned to that port. For the duration of the execution of the control word which established the LAC, data from the DSP port is sent to the appropriate Pstore channel via the PSTMX while data to the DSP port is obtained from the Pstore via the PRTMX. The select signals which configure the various multiplexers are shifted through a 16 by 6 Shift Register (SR) during each clock cycle of a 16-bit time slot and loaded into holding latches (in the SR) at the beginning of each time slot, thus reconfiguring the multiplexers on a per time slot basis. The output data from the PRTMXs are clocked through flip-flops prior to exiting the chip via the DSP port output data leads (SIDO-15).

Port Controller

Figure 14:
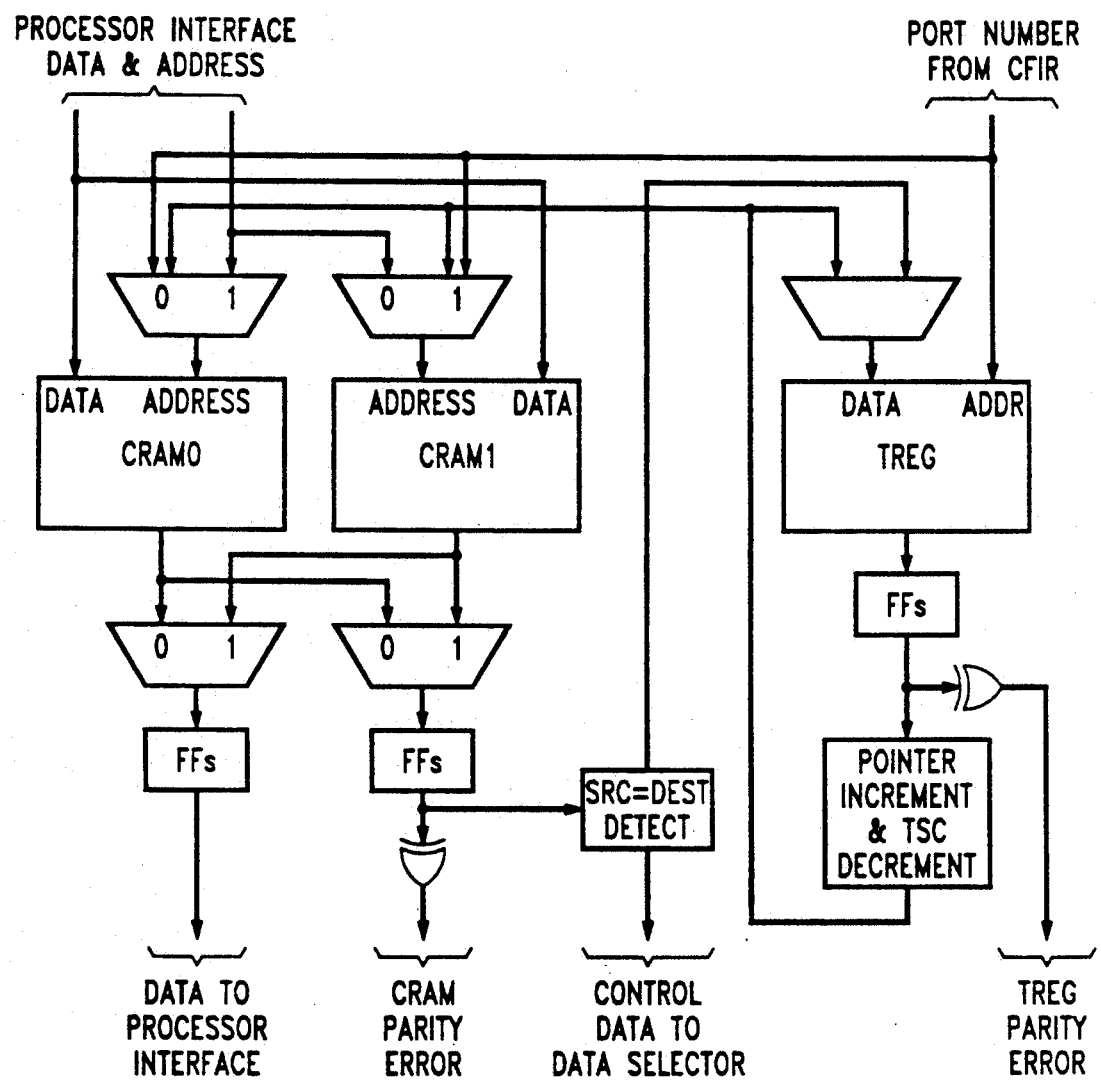
FIG. 14 is a block diagram of a port controller, a portion of which is in each of the 16 port circuits of FIG. 12.

The sixteen DSP ports are controlled by a single port controller shown in FIG. 14. The 16 control RAMs for the ports are contained in two 512 word by 17-bit Control RAMs (CRAM0 and CRAM1) with CRAM0 controlling ports 0 through 7 and CRAM1 controlling ports 8 through 15. During each clock cycle of a 16-bit time slot, the control word for a given port is read from one of the 64 locations assigned to contain that port's control information. The actual location of the 64 possible locations is determined by a pointer associated with that port and contained in a 16 word by 21-bit Register File (TREG). At a super frame boundary, all 16 pointers are initialized to zero such that the first location (of the 64) for each port is read for the control of first time slot configuration. The control word read for each port contains information regarding the type of control word (Port/Local Access or ADR), a bit indicating that the pointer for that port will be reset to zero following the completion of that control word execution (Go To Top Enable), the source for data destined to that port, and the repeat time slot count. The value of the Go To Top Enable bit and the repeat time slot count is loaded into the TREG along with the pointer value while the source select bit(s) and the type of control word is used to configure the port for that time slot. These configuration values are sent to the Shift Register (SR) of the DSEL where they are used at the beginning of the next time slot boundary to configure the multiplexers of the SDEL for each port. The Port Controller detects the condition of source equal to destination and checks the Local Access Enable bit to determine if a Local Access channel in the Pstore should be requested. If a Pstore channel is requested, the configuration bits to select the assigned Pstore channel are sent to the DSEL to complete the Local Access. The duration of the execution of a given control word for a port is determined by the time slot repeat count contained in the control work which is loaded into the TREG the first time that control word is read from the CRAM. From that point the time slot repeat count stored in the TREG is decremented each time slot and, when the value reaches zero, the pointer for that port is incremented or cleared (depending on the Go To Top Enable bit) such that a new control word is read for that port. Each of the 16 ports is assigned one clock cycle of the 16-bit time slot during which its control word is read from the CRAM and its TREG location is read for decrementing of the time slot repeat count. If the pointer for the control word has just changed as a result of the time slot repeat count reaching zero (and the pointer being changed) or a super frame sync pulse, the new pointer value, time slot repeat count and Go To Top Enable bit value is loaded into the TREG. If a time slot repeat count of zero is read for a given control word, that control word will continue to be executed until the next superframe sync resets the pointer for that port to zero.

Individual Interrupt Interval Register (IIIR)

Figure 15:
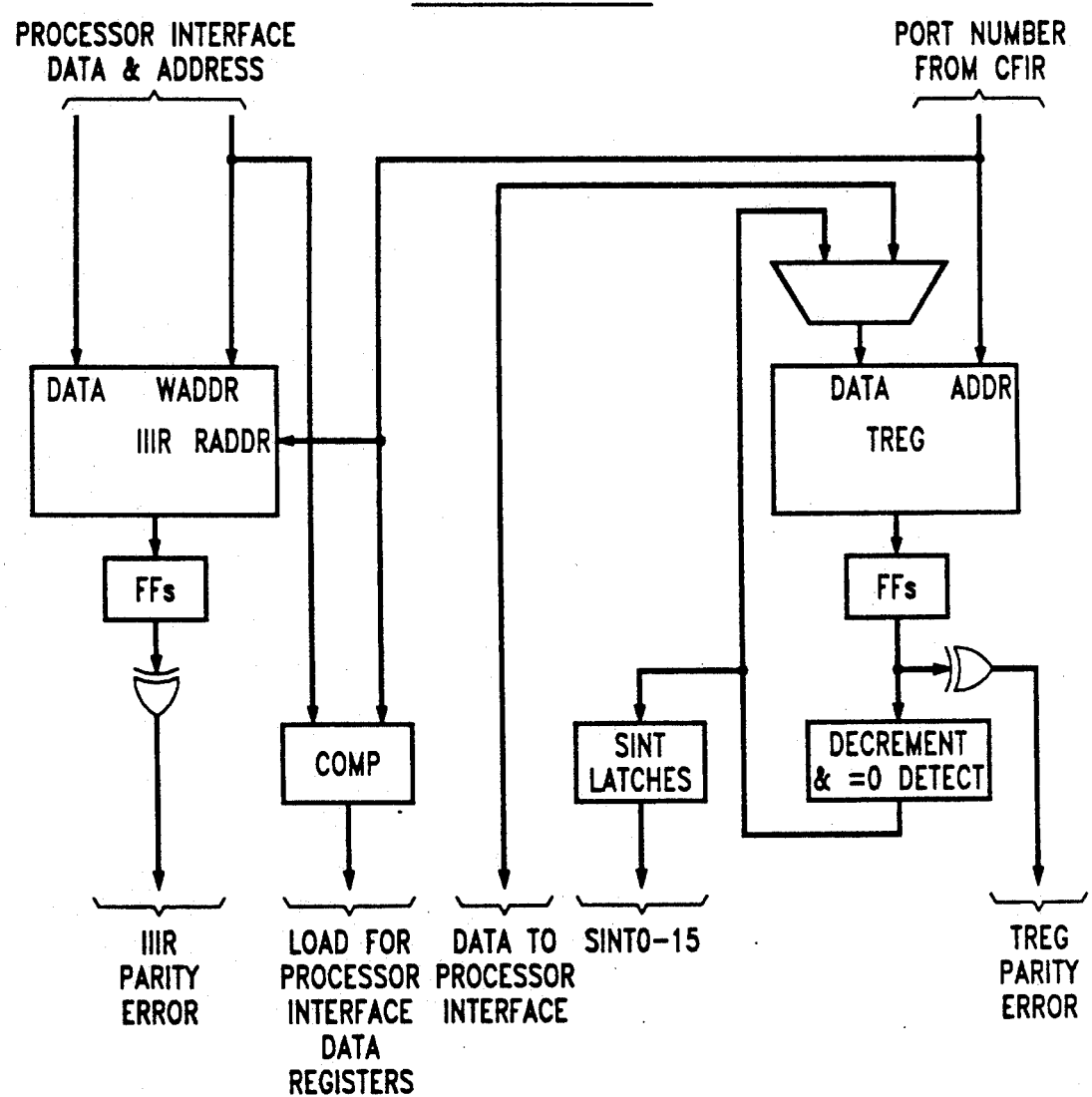
FIG. 15 is a block diagram of an interrupt register included in the network of FIG. 12.

Each DSP port has an interrupt signal (SINT0-15) whose frequency of activity is controlled by the Individual Interrupt Interval Register (IIIR). A block diagram of the IIIR is shown in FIG. 15. The IIIR consists of two 16 word by 18-bit register files. The IIIR register file contains the interval for each interrupt (a 16-bit value) and the Local Access Enable bit for each port. The ICNT register file contains the temporary count value for the interrupt interval for each port. Similar to the Port Controller, each port is serviced during one clock cycle of the 16-bit time slot. During a given time slot, the IIIR and ICNT register file entries are read for that port such that the LAC Enable bit for the port is passed to the Port Controller for determination of a Local Access Channel being requested and the temporary interval count of the ICNT is decremented. When the ICNT value for a port reaches zero, the SINT output for that port is activated and the IIIR value for the port is loaded into the ICNT register file. Otherwise, the decremented ICNT value is rewritten into the ICNT register file. At the beginning of the super frame, all IIIR values are transferred to the ICNT register file and decrementing begins. The values held in the IIIR register file are written via the processor interface and can be read as well; the ICNT cannot be directly written or read via the processor interface. Since all 16 clock cycles of a time slot are used to service the ports, a processor interface read of the IIIR is accomplished by comparing the address requested by the processor interface and the current read address of the IIIR register file such that when a match occurs, a signal is sent to the processor interface indicating that the output data of the IIIR register file is valid for the requested address and can be loaded into the data register of the processor interface. The activation of a given interrupt signal during the course of servicing a port does not imply that the associated SINT output will go low, but rather that the SINT output will go low at the appropriate time during the subsequent time slot as shown in FIG. 9.

Packet Store (Pstore)

Figure 16:
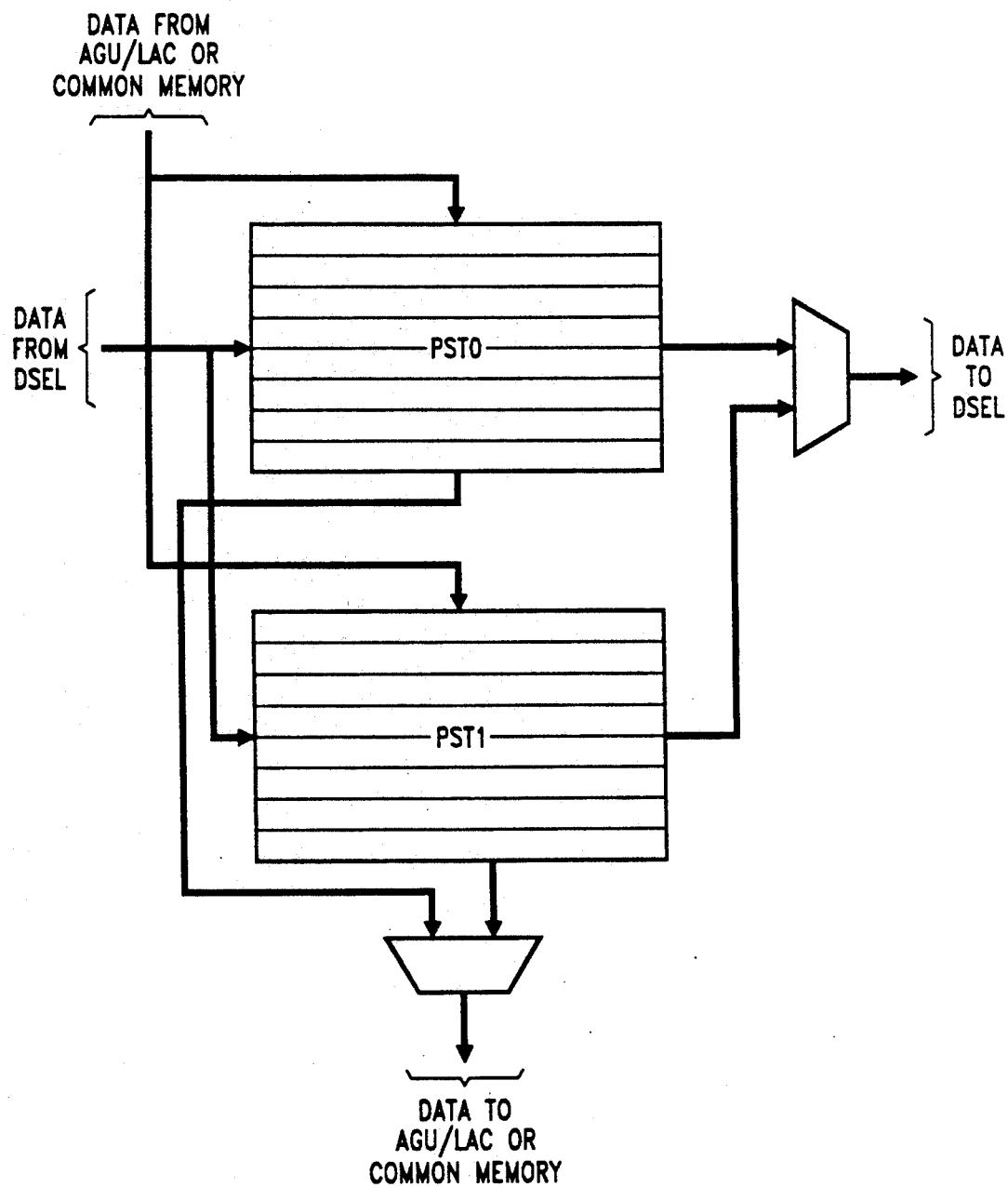
FIG. 16 is a block diagram of a packet store included in the network of FIG. 12.

The Pstore block diagram is shown in FIG. 16. The Pstore provides the ability for data access to/from the Address Generation Unit (AGU) and common memory. It consists of two banks of shift registers with each bank composed of eight 32-bit shift registers. During operation one bank will be shifting in data from the DSEL while the other bank is being serviced by the Local Access Controller (LAC). Once the new data has been shifted into one bank, the banks switch functions such that the other bank is shifting in data while shifting out the resultant data of its channels that were serviced. For example, suppose that bank 0 of (PSTO) has shifted in the eight channels of serial data from the DSEL and is ready to be serviced. The serial mode of operation ceases for PSTO and begins in PST1. During the 32 clock cycles required to shift new data into PST1, the 8 channels of data in PSTO are serviced by shifting those channels through PSTO in a parallel manner with each channel given 4 clock cycles to be serviced by the LAC. The resultant data, from a common memory read for example, is loaded into the top of the PST during the parallel shifts such that at the end of servicing the 8 channels, the data for channel 0 is back at the bottom of PSTO. At this point, the 2 banks reverse modes of operation and as PSTO begins to shift in the new serial data, the serviced data is shifting out and returning to the DSEL for distribution to the appropriate DSP ports (as set up by the Port Controller). As a result, serial data can be continually flowing into and out of the Pstore while being serviced in parallel with a bit latency of 64 clock cycles. The Pstore also has the option of supporting only 4 channels which is used for slower common memory speeds. Packet headers which indicate the type of operation to be performed are sent at the beginning of the Local Access channel and include reads/writes of the AGU memories as well as single or multiple reads/writes of the common memory.

Local Access Controller (LAC)

Figure 17:
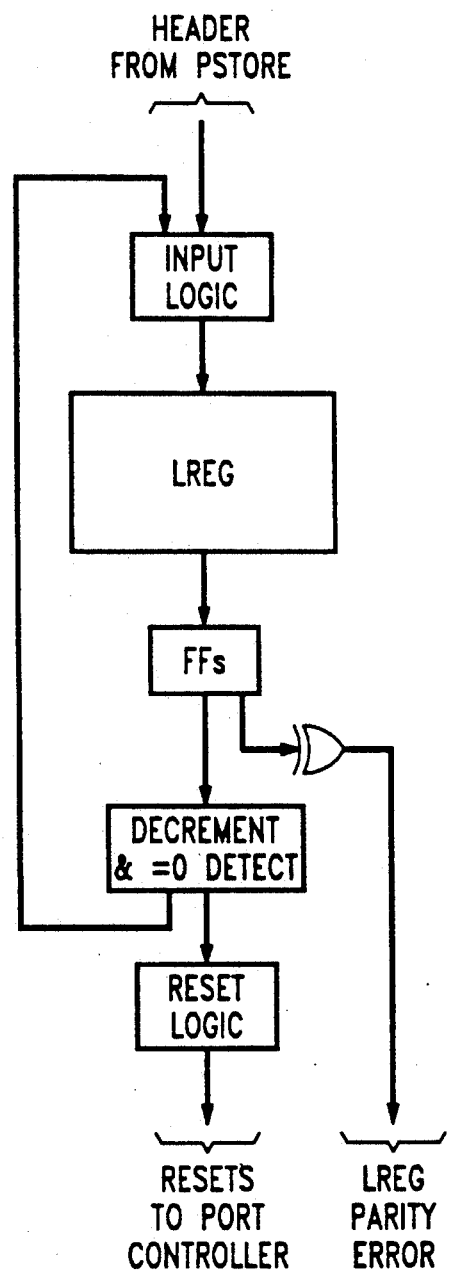
FIG. 17 is a block diagram of a local access controller included in the network of FIG. 12.

The LAC interprets the packet headers that come into the Pstore from the DSP ports and controls the execution of the instructions contained in the packet header. A block diagram of the LAC is shown in FIG. 17. Since the first 32 bits of data in a Local Access channel contains the packet header, each time a new channel is set up the LAC is informed by the Port Controller and the header is loaded into the LAC register file (LREG) after some manipulation of the header data. The acknowledge packet header is returned to the Pstore to be sent back to the DSP port. For the most part, the acknowledge header is simply the original header with a bit flipped, although in some cases meaningful response data is inserted. For example, a read or write to the ARAM/OREG/SREG will result in the data previously held in the specified address location of the OREG/SREG being read and inserted in the acknowledge header. After the decoded header information is stored in the LREG, the LAC will continue to service that channel during its specific time allotted from each 32 clock cycle period until the header instruction has been completed. In the case of ARAM or single word common memory accesses, one additional 32 clock cycle period is required to complete the specified operation. During multiple word common memory accesses, a repeat count is specified in the header which is decremented each time the LREG is read for that channel with the resultant decremented value written back into the LREG. Once a Local Access channel has been completely serviced, the LAC sends a reset signal to the Port Controller to relinquish that channels access to the Pstore. If the CRAM entry for that port specifies source equal to destination for additional time slots, the data from the DSP is looped back to that DSP's output port. During a Local Access channel, the LAC controls the SILD and SOLD signals to the given DSP port according to the operation being performed. For example, during the special case of a multiple word write to the common memory, SOLD signals will be generated for the duration of the LAC repeat count with a connection made to the Pstore such that the CRAM pointer for that port can be advanced and data can be received by that DSP from sources other than the LAC. The LAC also provides control to the common memory Interface in terms of the MAV, MDV, and MRW outputs during read and write operations to the common memory.

Address Generation Unit (AGU)

Figure 18:
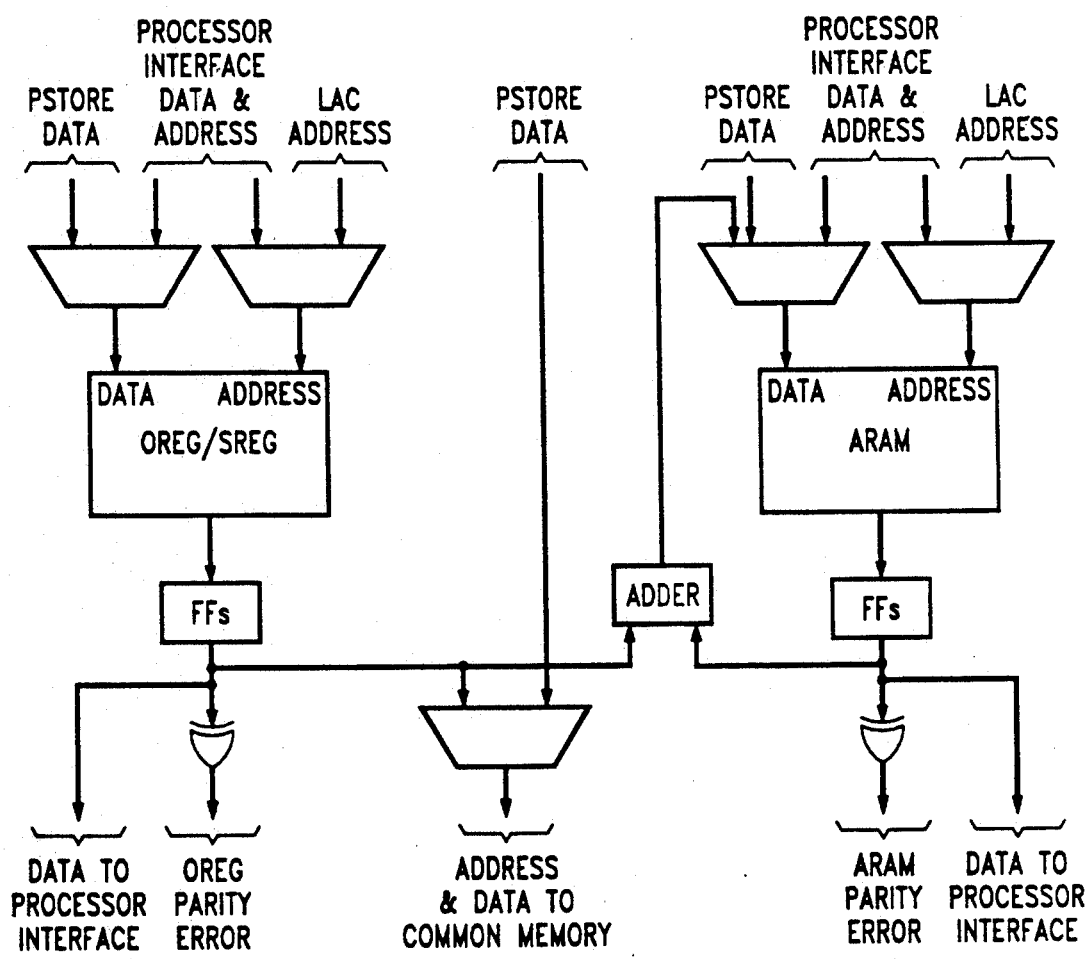
FIG. 18 is a block diagram of an address generation unit included in the network of FIG. 12.

A block diagram of the AGU is shown in FIG. 18. The primary function of the AGU is to generate addresses for the common memory during multiple word reads or writes, thus alleviating the DSPs of the need to send an address for every access. The Address RAM (ARAM) is used to hold the starting addresses to be accessed in common memory. The ARAM is a 128 word by 31 bit RAM. The OREG is used to hold offset values to be added to the addresses in the ARAM during address generation for multiple accesses. The OREG is contained in a 32 word by 18-bit register file with 16 bits of each word used to specify an offset value. During address generation, the address contained in a specified location in the ARAM is sent to the common memory while the offset value (contained in a specified location in the OREG) is added to the address with the results of the addition re-written back into the ARAM location. The OREG also contains a semaphore bit per word (called the SREG) which can be used for resource allocation. In addition to the offset values written in the OREG, standard offset value of 0 or 1 can be specified in the header instruction. The scenario would be that a DSP desiring a multiple access of the Common Memory (a series of write operations for example) would first write a location in the ARAM with the starting address. If an offset value other than the standard offset is desired, the DSP would write this value in a location in the OREG. Each of these write operations would require a Local Access channel to be set up in the CRAM for that port. Finally, the DSP would send a header indicating a multiple word write where the header would contain the locations of the ARAM and OREG to be accessed for address generation. From that point the LAC would send the necessary control to the AGU to have the ARAM and OREG locations read, passing the address from the ARAM to the Common Memory interface, adding the offset value to the address in the ADDER, and writing the resultant address back into the ARAM for the next access of the common memory. While this is occurring, the DSP would be passing the data to be written into the common memory into the Pstore where it is routed to the AGU for output onto the common memory Address/Data Bus subsequent to the address. The upper two bits of the address can be optionally decoded by the AGU to create board selects for multiple common memory boards.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. Apparatus for performing real-time, digital signal processing comprising
   a plurality of digital signal processors each including memory and each programmed to perform a part of a digital signal processing function and
   a synchronous network for providing time division multiplexed communication links for communicating intermediate processing results between ones of said processors in performance of said digital signal processing function, said network comprising
   a plurality of port circuits each connected to an associated one of said processors, and
   timing means for generating timing signals defining frames of time slots and defining superframes comprising N of said frames, N being a positive integer,
   wherein each of said port circuits comprises means responsive to said timing signals for controlling the transmission of digital data, to said each port circuit from the memory of the processor associated with said each port circuit, during M1 time slots of each of said superframes, where M1 is a positive integer which may vary among said plurality of port circuits, and
   wherein said each port circuit further comprises means responsive to said timing signals for controlling the writing of digital data, from said each port circuit into the memory of the processor associated with said each port circuit, during M2 time slots of each of said superframes, where M2 is a positive integer which may vary among said plurality of port circuits.

2. Apparatus in accordance with claim 1 wherein said network provides full connectivity among said processors such that any one of said processors is connectable to any other one of said processors.

3. Apparatus in accordance with claim 1 wherein each of said plurality of port circuits comprises
   data selector means for selectively connecting any one of said plurality of port circuits to said each port circuit, and
   control memory means for controlling the selective connections of said data selector means.

4. Apparatus in accordance with claim 1 further comprising
   a common memory coupled to said network for use by each of said processors.

5. Apparatus in accordance with claim 4 wherein said common memory is the source of input signals for said digital signal processing function.

6. Apparatus in accordance with claim 1 further comprising
   a time division multiplexed line external to said network for transmitting final results of said digital signal processing function,
   said network further comprising a port circuit connected to said time division multiplexed line for receiving said final results from one of said processors and transmitting said final results on said time division multiplexed line.

7. Apparatus in accordance with claim 1 further comprising
   a time division multiplexed line external to said network for transmitting input signals for said digital signal processing function,
   said network further comprising a port circuit connected to said time division multiplexed line for receiving said input signals and transmitting said input signals to one of said processors.

8. Apparatus in accordance with claim 1 wherein said memory of each of said processors is a double-buffered memory.

9. Apparatus in accordance with claim 1 wherein each of said plurality of port circuits further comprises
   means for transmitting an interrupt signal to the processor associated with that port circuit.

10. Apparatus in accordance with claim 9 where the interrupt rate of said interrupt signal is programmable for each of said plurality of port circuits.

11. Apparatus in accordance with claim 1 where the value of N is programmable.

12. Apparatus in accordance with claim 1 where the values of M1 and M2 are programmable for each of said plurality of port circuits.

13. Apparatus in accordance with claim 1 where said M1 time slots may be non-consecutive time slots and said M2 time slots may be non-consecutive time slots.

14. A synchronous network for providing time division multiplexed communication links for communicating intermediate processing results between ones of a plurality of digital signal processors each including memory and each programmed to perform a part of a digital signal processing function, said network comprising
   a plurality of port circuits each connected to an associated one of said processors, and
   timing means for generating timing signals defining frames of time slots and defining superframes comprising N of said frames, N being a positive integer,
   wherein each of said port circuits comprises means responsive to said timing signals for controlling the transmission of digital data, to said each port circuit from the memory of the processor associated with said each port circuit, during M1 time slots of each of said superframes, where M1 is a positive integer which may vary among said plurality of port circuits, and
   wherein said each port circuit further comprises means responsive to said timing signals for controlling the writing of digital data, from said each port circuit into the memory of the processor associated with said each port circuit, during M2 time slots of each of said superframes, where M2 is a positive integer which may vary among said plurality of port circuits.

15. A synchronous network in accordance with claim 14 comprising an integrated circuit.

16. Apparatus in accordance with claim 1 wherein said network provides full connectivity among said processors such that any one of said processors is connectable to any combination of other ones of said processors.

17. Apparatus for performing real-time, digital signal processing comprising
   a plurality of digital signal processors each including memory and each programmed to perform a part of a digital signal processing function and
   a synchronous network for providing time division multiplexed communication links for communicating intermediate processing results between ones of said processors in performance of said digital signal processing function, said network comprising
   a plurality of port circuits each connected to an associated one of said processors, and
   timing means for generating timing signals defining frames of time slots, wherein each of said port circuits comprises means responsive to said timing signals for controlling the transmission of digital data, to said each port circuit from the memory of the processor associated with said each port circuit, wherein said each port circuit further comprises means responsive to said timing signals for controlling the writing of digital data, from said each port circuit into the memory of the processor associated with said each port circuit, and wherein said each port circuit further comprises data selector means for selectively connecting any one of said plurality of port circuits to said each port circuit, and control memory means for controlling the selective connections of said data selector means.

18. Apparatus in accordance with claim 17 wherein said network provides full connectivity among said processors such that any one of said processors is connectable to any other one of said processors.

19. Apparatus in accordance with claim 17 wherein said network provides full connectivity among said processors such that any one of said processors is connectable to any combination of other ones of said processors.

20. Apparatus in accordance with claim 17 further comprising a common memory coupled to said network for use by each of said processors.

21. Apparatus in accordance with claim 20 wherein said common memory is the source of input signals for said digital signal processing function.

22. Apparatus in accordance with claim 17 further comprising a time division multiplexed line external to said network for transmitting final results of said digital signal processing function, said network further comprising a port circuit connected to said time division multiplexed line for receiving said final results from one of said processors and transmitting said final results on said time division multiplexed line.

23. Apparatus in accordance with claim 17 further comprising a time division multiplexed line external to said network for transmitting input signals for said digital signal processing function, said network further comprising a port circuit connected to said time division multiplexed line for receiving said input signals and transmitting said input signals to one of said processors.

24. Apparatus in accordance with claim 17 wherein said memory of each of said processors is a double-buffered memory.

25. Apparatus in accordance with claim 17 wherein each of said plurality of port circuits further comprises means for transmitting an interrupt signal to the processor associated with that port circuit.

26. Apparatus in accordance with claim 25 where the interrupt rate of said interrupt signal is programmable for each of said plurality of port circuits.

27. A synchronous network for providing time division multiplexed communication links for communicating intermediate processing results between ones of a plurality of digital signal processors each including memory and each programmed to perform a part of a digital signal processing function, said network comprising a plurality of port circuits each connected to an associated one of said processors, and timing means for generating timing signals defining frames of time slots, wherein each of said port circuits comprises means responsive to said timing signals for controlling the transmission of digital data, to said each port circuit from the memory of the processor associated with said each port circuit, wherein said each port circuit further comprises means responsive to said timing signals for controlling the writing of digital data, from said each port circuit into the memory of the processor associated with said each port circuit, wherein said each port circuit further comprises data selector means for selectively connecting any one of said plurality of port circuits to said each port circuit, and control memory means for controlling the selective connections of said data selector means.

28. A synchronous network in accordance with claim 27 comprising an integrated circuit.

* * * * *